March 1, 1927.  J. A. McNAMARA  1,619,745

MILK BOTTLE PROTECTOR

Filed June 17, 1926

WITNESSES
Edw. Thorpe
J. T. McAuliffe

INVENTOR
James A. McNamara
BY Munn & Co
ATTORNEYS

Patented Mar. 1, 1927.

1,619,745

UNITED STATES PATENT OFFICE.

JAMES A. McNAMARA, OF NEW YORK, N. Y.

MILK-BOTTLE PROTECTOR.

Application filed June 17, 1926. Serial No. 116,668.

My invention relates to a receptacle to be employed by householders and in which receptacle one or more milk bottles may be placed by the one delivering the milk, the invention relating particularly to a receptacle which, in practice, includes means to lock the receptacle so that it is to be accessible only to the householder.

The general object of my invention is to provide a milk receptacle of the indicated type improved particularly with respect to the means for effecting automatic locking of the receptacle by the act of placing the milk bottle in position.

The nature of my invention and its distinguishing features and advantages will clearly appear as the description proceeds.

Reference is to be had to the accompanying drawings forming a part of this specification, it being understood that the drawings are merely illustrative of one example of the invention.

In carrying out my invention in practice, in accordance with the illustrated example, a box-like receptacle 10 is provided which may be fastened in position, as, for example, by screws indicated at 11 passed through the bottom of the receptacle 10 and into the floor of a stoop or other support. The receptacle 10 has an open front side and near the bottom a fixed ledge or small platform 12 extends forwardly and is suitably sustained as by brackets 13. Said ledge is adapted to accommodate a milk bottle A.

Figure 1:
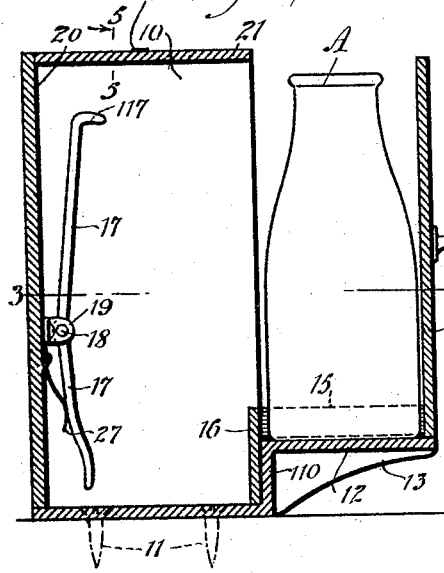
Figure 1 is a vertical section of a milk bottle protector embodying my invention showing the same open and before the movement of the milk bottle into the receptacle.
Figure 2:
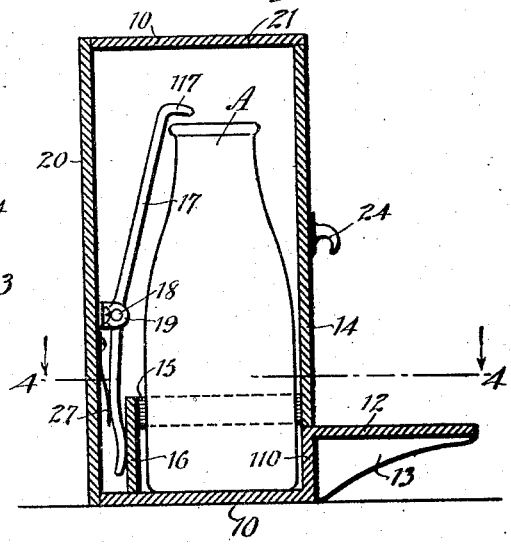
Figure 2 is a view similar to Figure 1 but showing the structure closed and the milk bottle retained in position within the receptacle.
Figure 3:
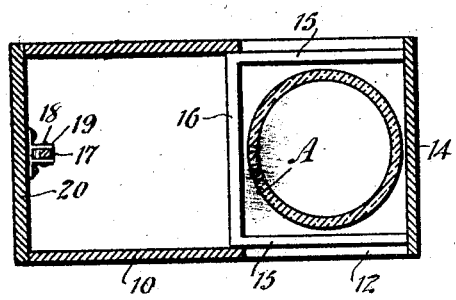
Figure 3 is a horiontal section on the line 3—3, Figure 1.
Figure 4:
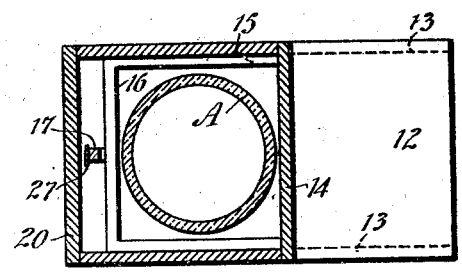
Figure 4 is a horizontal section on the line 4—4, Figure 2.
Figure 5:
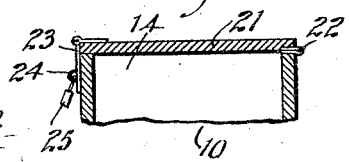
Figure 5 is a detail in transverse vertical section at the upper portion of the illustrated receptacle.

Disposed on the ledge 12 and slidable thereon from the position adjacent the front edge as in Figure 1 to a position adjacent the rear edge of said ledge 12 and constituting a closure of the open side of the receptacle 10, is a member or panel 14 integral with which are side bars 15 spaced to lie at each side of the ledge 12 and at the sides of the milk bottle A. Rigid with both side bars 15 and forming a connection between the same at the inner ends is a stop 16 to limit the forward movement of the panel 14, said stop member 16 extending downwardly from the side bars 15 preferably lies with its lower edge in a plane adjacent the bottom of the receptacle 10. Said receptacle 10 at the bottom and below the open front side of said receptacle, is formed with an upstanding front member 110 which in one position of the closure panel 14 is adapted to be engaged by the stop element 16 to limit the outward movement of panel 14.

Within the receptacle 10 is a retaining element 17 adapted to assume such a position relatively to the top of the milk bottle A when the latter is placed within said receptacle as to prevent tilting or upsetting of the bottle. Said element 17 is here shown as consisting of a vertically disposed bar pivoted between its ends as at 18 between brackets 19 or other supporting means on the back 20 of receptacle 10. Behind the bar 17 is a spring 27 normally tending to press forward the lower end of said bar and thereby dispose the upper end in a rear position adjacent the back 20.

The receptacle 10 is formed with an opening for the removal of the bottle. Since the receptacle will in most cases be placed close against the front of the house on a porch or against the rear wall of the house, the opening is formed at the top in the illustrated form to be closed by the top 21 which is hinged at one edge to a side of receptacle 10 as at 22 and is provided with any suitable lock at the opposite edge, there being shown a hasp 24 to pass over a staple 25, for the staple to receive a lock 26.

In use, a person delivering milk, places the bottle A on the ledge 12 after pulling the panel 14 outwardly. Thus, the bottle is held at the bottom between the side bars 15. The bottle having been placed on the ledge 12 the panel 14 is moved inwardly to close the open front side of receptacle 10. The inward movement of the bottle displaces it from the ledge 12 and causes said bottle to drop behind member 110 of the receptacle 10. At the same time the stop member 16 which is at the back of the milk bottle A is caused to press against the lower end of the bar 17, thus compressing the spring 27 and tilting the upper end of the bar 17 forwardly so that its hooked upper terminal 117 assumes a position over the top of milk bottle A to prevent tilting or upsetting of the bottle as it is moved inwardly away from the support afforded by the support 12 and thus the bottle neck has no room for clearance in any tendency of the bottle to tilt sidewise when the bottle neck is beneath end 117. The provision of support 12 results in the displacing and housing of the bottle by the operation of moving the panel 14 to the position closing the front of receptacle 10 and at the same time the action automatically positions the bottle in engagement with retainer 17.

I would state furthermore that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. A milk bottle protector including a receptacle having a support at the front to receive a milk bottle and having an open front side above said support, and a panel movable from an outer position adjacent the outer edge of said support, to an inner position closing the front of said receptacle, said panel adapted to displace the milk bottle from said support and deposit it within the receptacle; together with a member below the front opening of the receptacle, and a stop element movable with said panel to a position to engage said front member and arrest the outward movement of the panel.

2. A milk bottle protector including a receptacle having a support at the front to receive a milk bottle and having an open front side above said support, and a panel movable from an outer position adjacent the outer edge of said support, to an inner position closing the front of said receptacle, said panel adapted to displace the milk bottle from said support and deposit it within the receptacle; together with a member below the front opening of the receptacle, and a stop element movable with said panel to a position to engage said front member and arrest the outward movement of the panel, as well as means actuated by said stop member in the inward movement thereof to engage the milk bottle and prevent tipping thereof.

JAMES A. McNAMARA.